Figure 11:
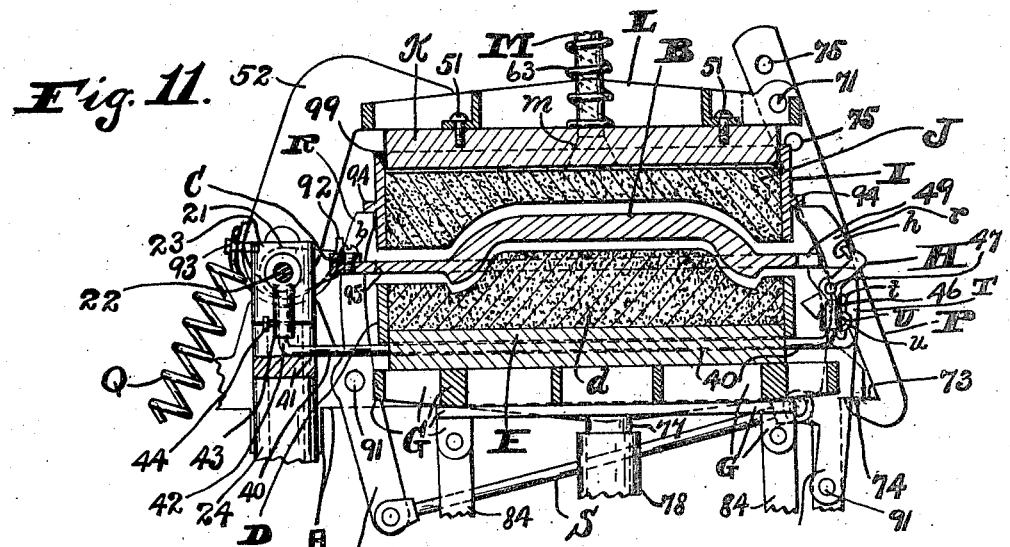

W. C. LANG.
MOLD MAKING MACHINE.
APPLICATION FILED OCT. 31, 1913.
1,093,439.
Patented Apr. 14, 1914.
6 SHEETS—SHEET 1.
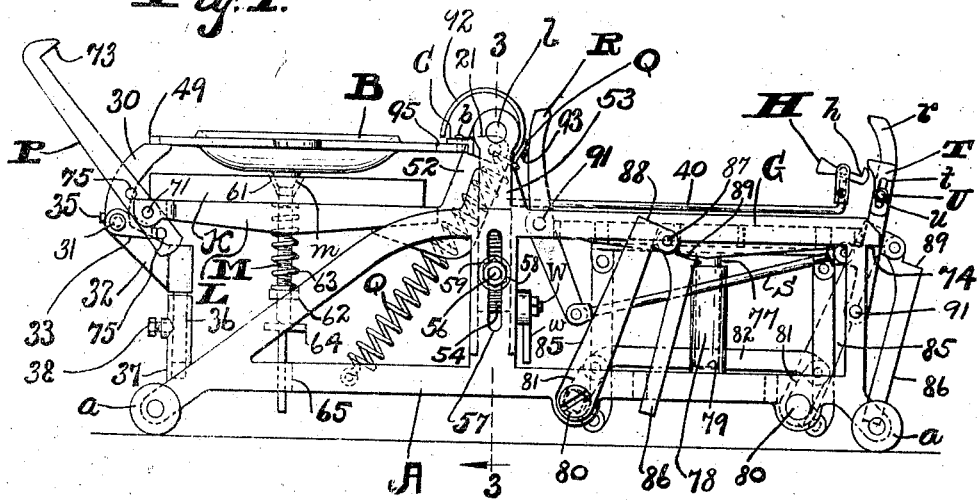
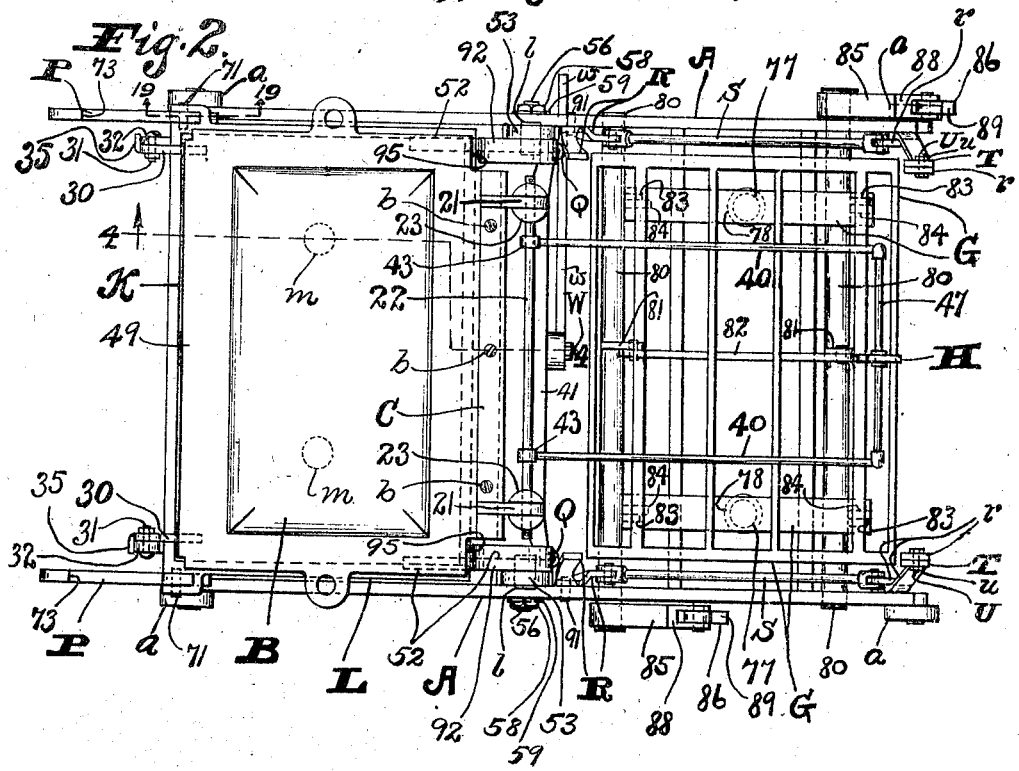
Witnesses:
H. J. Gettins
B. C. Brown.
Inventor
William C. Lang
By [signature]
Attorneys

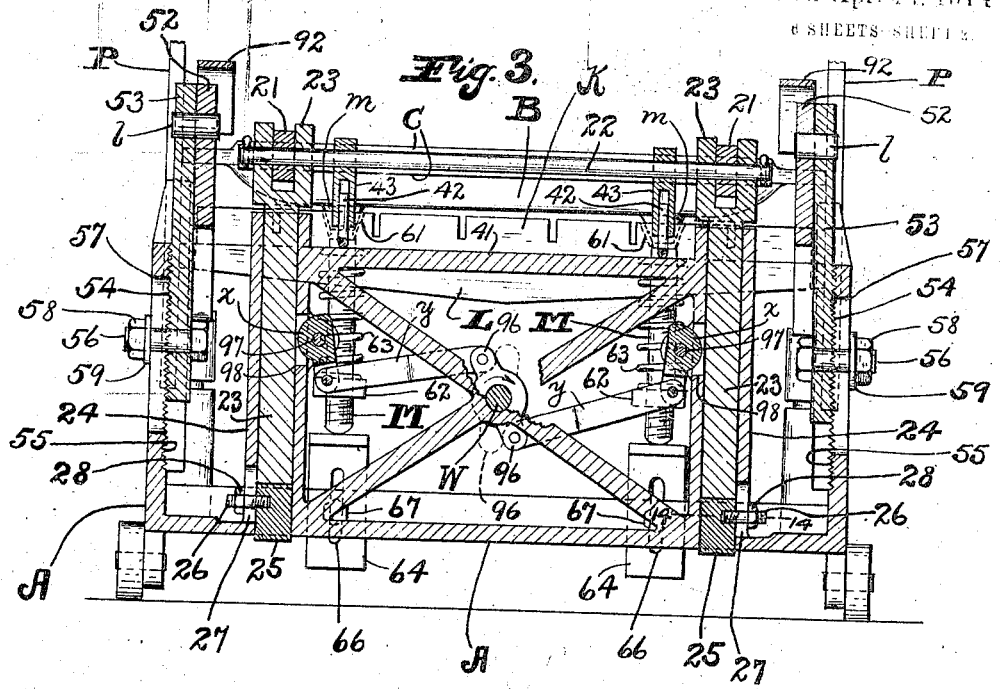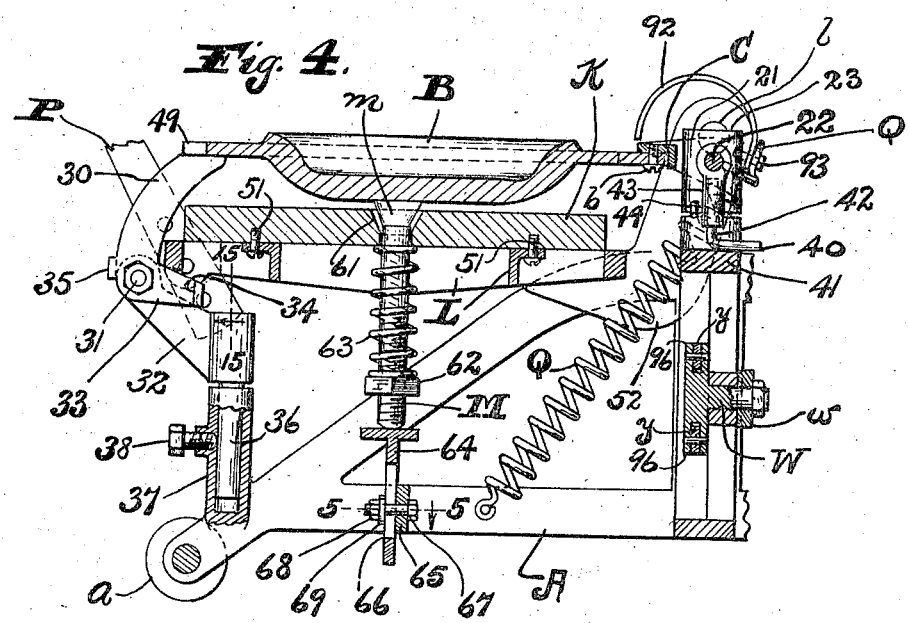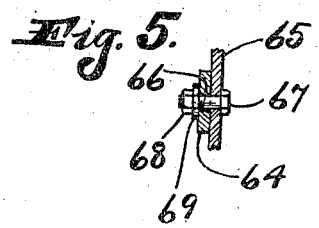

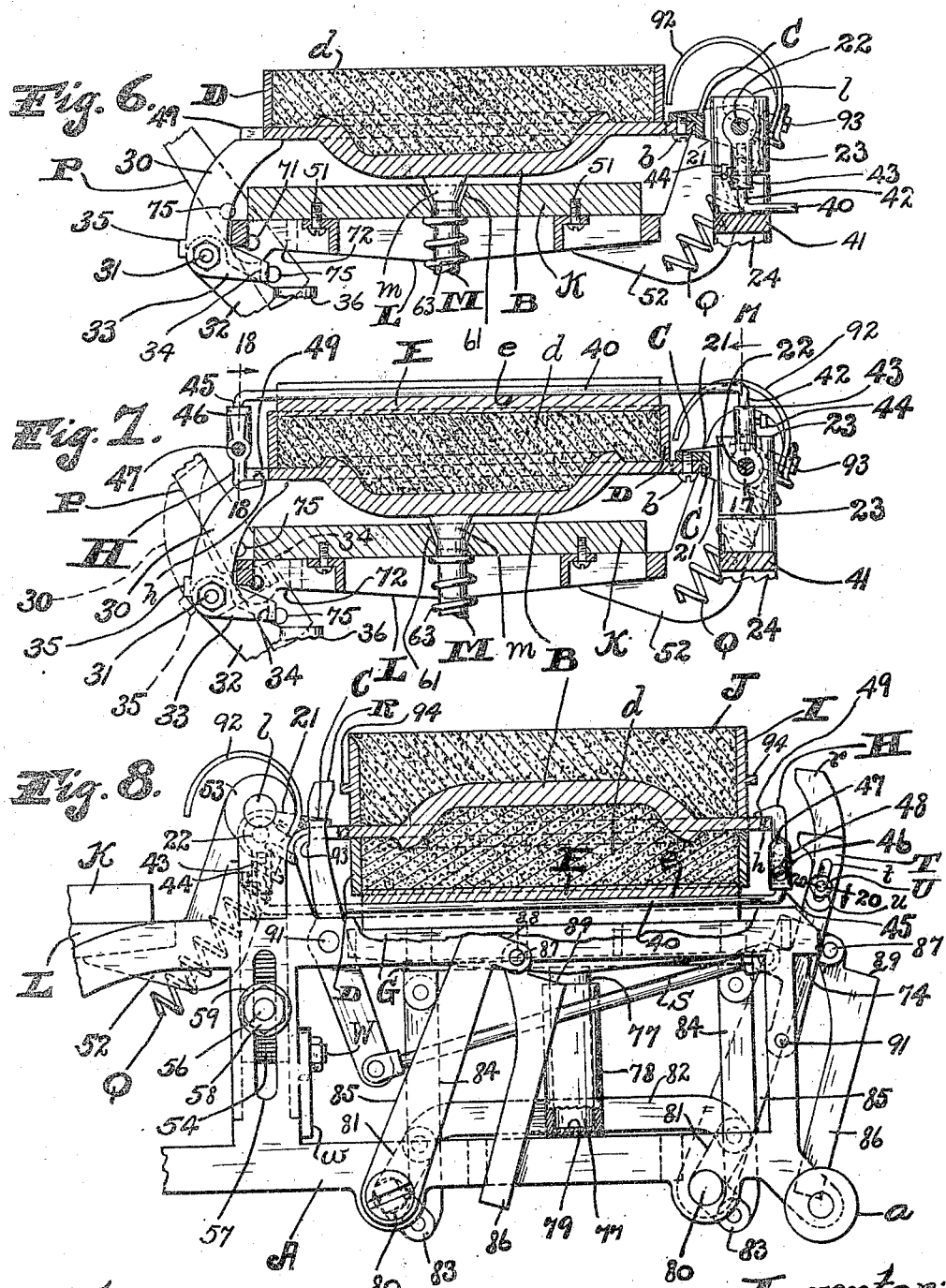

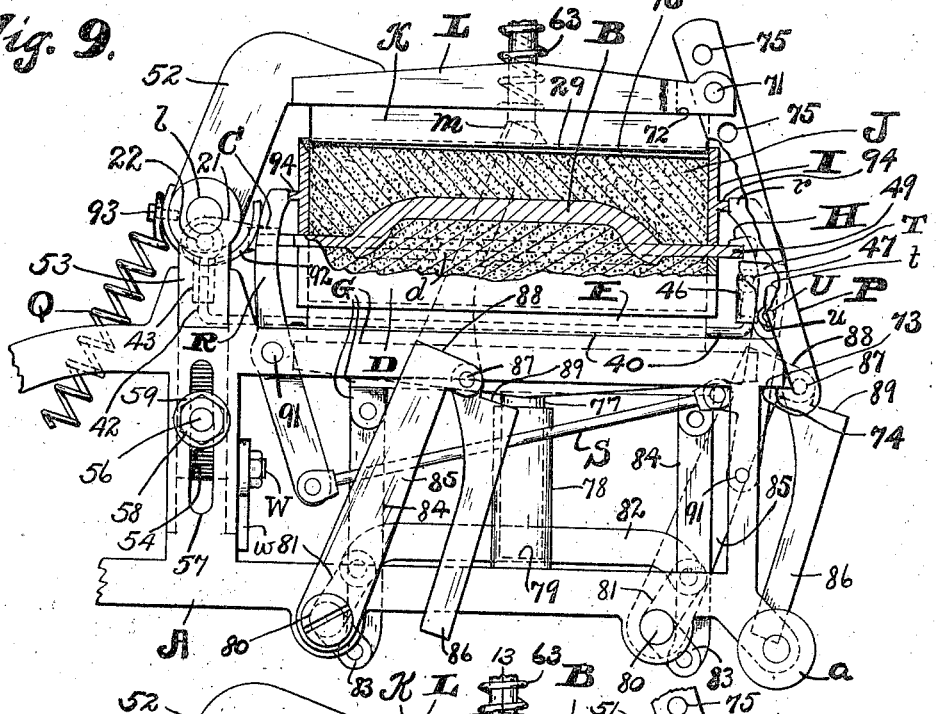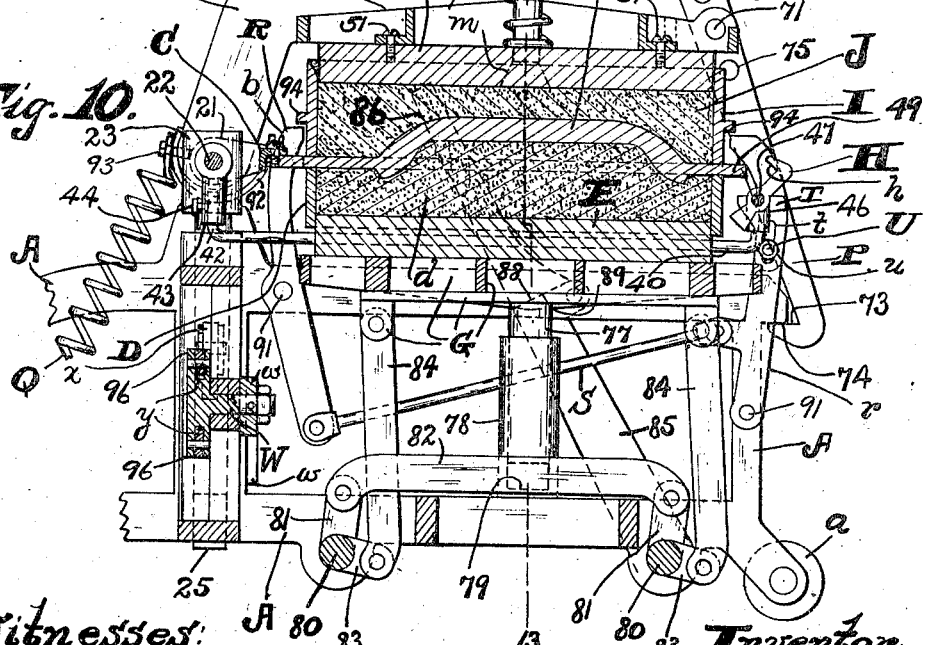

W. C. LANG.
MOLD MAKING MACHINE.
APPLICATION FILED OCT. 31, 1913.

1,093,439.

Patented Apr. 14, 1914.
6 SHEETS—SHEET 5.

Witnesses
H. J. Gettins.
B. C. Brown.

Inventor
William C. Lang
By
Attorneys

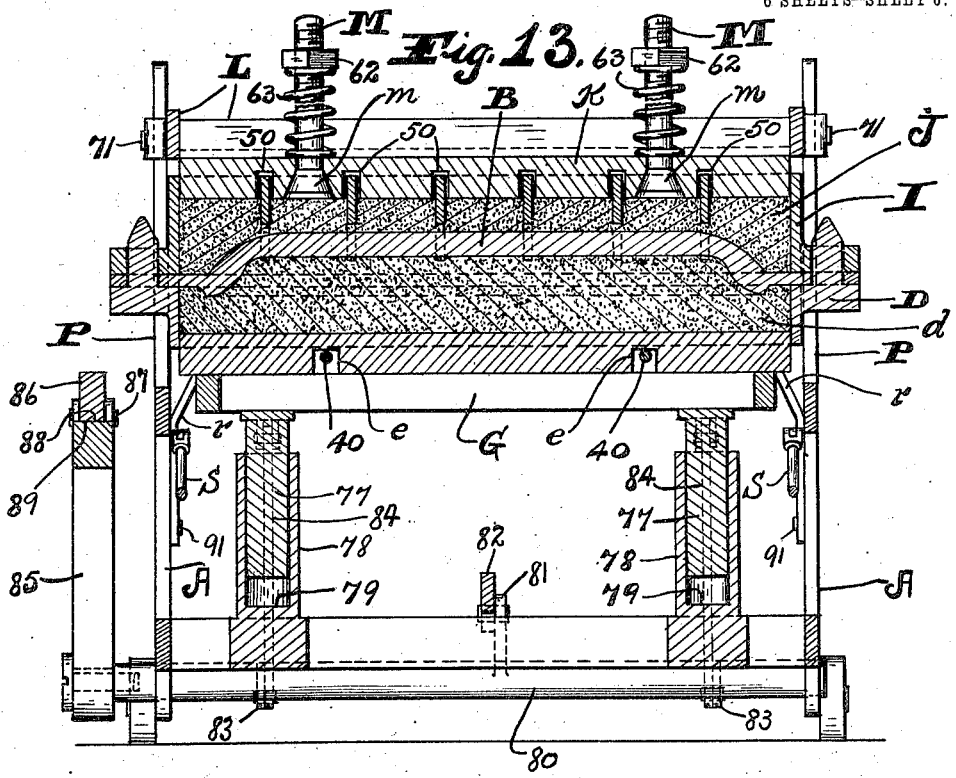
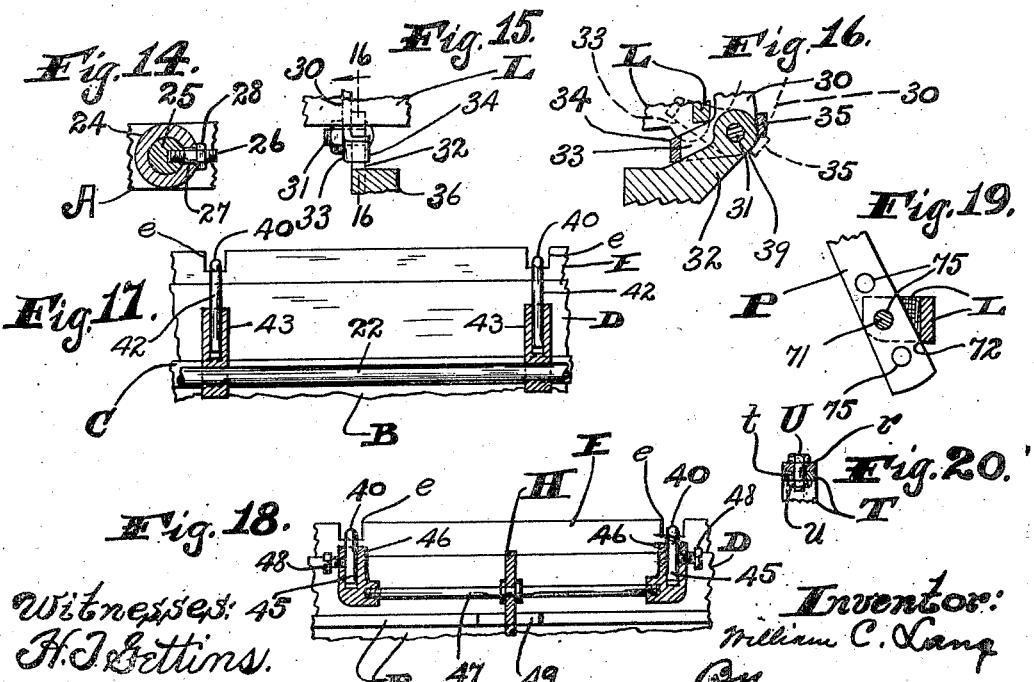

UNITED STATES PATENT OFFICE.

WILLIAM C. LANG, OF CLEVELAND, OHIO.

MOLD-MAKING MACHINE.

1,093,439.

Specification of Letters Patent. Patented Apr. 14, 1914.

Application filed October 31, 1913. Serial No. 798,422.

*To all whom it may concern:*

Be it known that I, WILLIAM C. LANG, a citizen of the United States of America, residing at Cleveland, in the county of Cuyahoga and State of Ohio, have invented certain new and useful Improvements in Mold-Making Machines; and I hereby declare the following to be a full, clear, and exact description of the invention, such as will enable others skilled in the art to which it pertains to make and use the same.

This invention relates to improvements in mold-making machines, and pertains more especially to a mold-making machine comprising a table, a movable holder or carrier for a pattern-plate, a pattern-plate borne by said carrier, and a movable head for covering the molding sand supplied to the upper flask-section of a mold, the aforesaid table forming a support for a mold-bottom which has the contour and dimensions required to render it capable of entering and moving endwise of the lower flask-section of said mold and to extend externally of said flask-section downwardly from the body of molding sand supplied to said flask-section, the aforesaid carrier being arranged to move the pattern-plate into a position in which the pattern-plate covers the lower flask-section when the latter is arranged right-end up substantially horizontally over the aforesaid table, the aforesaid head having the contour and dimensions required to render it capable of entering the upper flask-section upon being actuated into position covering the molding sand supplied to said upper flask-section, and said head in said position, the pattern-plate in its aforesaid position and the aforesaid table being capable of relative readjustment to reduce the distance between the table and the pattern-plate and between the pattern-plate and said head.

This invention pertains more especially to a machine in which both the drag and the cope of the mold are formed and in which is employed a double-faced pattern-plate borne by a holder or carrier which is oscillatorily supported and arranged to swing in a vertical plane and being arranged over and spaced from the aforesaid table when it has been swung into a substantially horizontal position at one side of the axis of said carrier and being arranged to receive the lower flask-section lower-end-up when it has been swung into a substantially horizontal position at the opposite side of said axis to be there supplied from above with molding sand and the aforesaid mold-bottom, so that said flask-section and said mold-bottom, upon supplying said flask-section with molding sand and applying said mold-bottom to said flask-section, can be swung with the pattern-plate into position over the aforesaid table on which said mold-bottom is then arranged to rest and so that the pattern-plate, upon the delivery of said flask-section right-end-up over said table, not only rests on said flask-section but is in position to receive the upper flask-section which upon being there supplied with molding sand is adapted to receive the aforesaid head which is actuated into position over the sand supplied to said upper flask-section whereupon said head, the pattern-plate and the aforesaid mold-bottom-bearing table are relatively readjusted to reduce the distance between the mold-bottom and the pattern-plate and between the pattern-plate and said head and thereby effect a compression of the sand-bodies in both flask-sections and simultaneously complete the cope and the drag of the mold.

The primary object of this invention is to greatly facilitate the formation of a complete mold consisting of a cope and a drag comprising the upper flask-section and the lower flask-section respectively.

Another object is to compress the body of molding sand supplied to said lower flask-section and the body of molding sand supplied to said upper flask-section during one and the same relative readjustment of the aforesaid head, pattern-plate and table.

Another object is to relatively arrange the movable members of the machine to insure convenience and facility in the operation of the machine.

Another object is to provide a construction permitting non-uniformity in the depth of pattern-plates and flask-sections employed in making different molds.

With these objects in view, and to the end of attaining other advantages hereinafter appearing, this invention consists in certain features of construction, and combinations and arrangement of parts hereinafter described, pointed out in the claims, and illustrated in the accompanying drawings.

Figure 12:
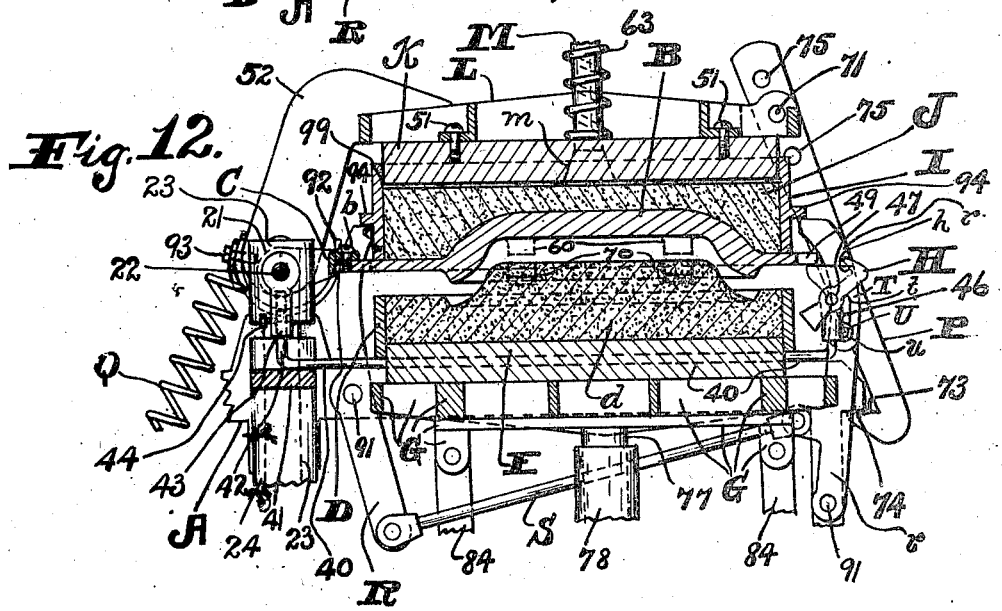

In said drawings, Figure 1 is a side elevation of a mold-making-machine embodying my invention. Fig. 2 is a top plan relative to Fig. 1. Fig. 3 is a vertical section on line 3—3, Fig. 1, looking in the direction indicated by the arrow. Fig. 4 is a vertical section on line 4—4, Fig. 2. Fig. 5 is a horizontal section, in detail, on line 5—5, Fig. 4. Fig. 6 shows the upper portion of Fig. 4 and furthermore illustrates the hereinbefore mentioned lower flask-section mounted lower-end-up on the pattern-plate and filled with molding sand. Fig. 7 is a view corresponding with Fig. 6, except that Fig. 7 shows the body of molding sand in the lower flask-section slightly compressed by a mold-bottom mounted on said body and illustrates means employed for holding said mold-bottom, said flask-section and the pattern-plate together. Fig. 8 is a side view, partly in section, of a portion of the machine and illustrates the pattern-plate and connected lower flask-section and mold-bottom as having been swung from the position shown in Fig. 7 into position over the hereinbefore mentioned table, and shows said flask-section right-end-up and the aforesaid mold-bottom resting on said table, and also shows the upper flask-section of a mold mounted on the pattern-plate and filled with molding sand. Fig. 9 is a view similar to Fig. 8, but in Fig. 9 the head instrumental in compressing the body of molding sand in the upper flask-section is shown in position covering said body after slightly compressing said body. Fig. 9 also illustrates means employed for preventing upward movement of said head in the sand-covering position of the head and illustrates a partial movement of certain seat-forming members instrumental in supporting the upper flask-section independently of the pattern-plate when required. Fig. 10 is a view similar to Fig. 9, but Fig. 10 shows said head, the pattern-plate and the hereinbefore mentioned table relatively readjusted to reduce the distance between the mold-bottom and the pattern-plate and between the pattern-plate and said head, and Fig. 10 also illustrates the completion of the drag and the cope of the mold and shows the aforesaid seat-forming members for the upper flask-section as having moved into position under projecting members formed on and externally of said flask-section. Fig. 11 is a side view, largely in vertical section, showing the upper flask-section, and consequently the cope, supported by said seat-forming members for said flask-section, and illustrates the pattern-plate as lowered independently of the cope and the drag as lowered independently of the pattern-plate. Fig. 12 is a view, largely in vertical section, showing the pattern-plate held to the cope while the drag is lowered by gravity. Fig. 13 is a vertical section on line 13—13, Fig. 10, looking inwardly. Fig. 14 is a horizontal section, in detail, on line 14—14, Fig. 3. Fig. 15 is a vertical section, in detail, on line 15—15, Fig. 4, looking outwardly. Fig. 16 is a vertical section, in detail, on line 16—16, Fig. 15. Fig. 17 is a vertical section, in detail, on line 17—17, Fig. 7, looking in the direction indicated by the arrow. Fig. 18 is a vertical section, in detail, on line 18—18, Fig. 7, looking in the direction indicated by the arrow. Fig. 19 is a vertical section, in detail, on line 19—19, Fig. 2. Fig. 20 is a section, in detail, on line 20—20, Fig. 8.

Portions are broken away in the drawings to reduce their size and to more clearly show certain features of construction.

Referring to the drawings, A indicates the supporting framework of the machine, which framework is shown mounted on wheels $a$ to render the machine capable of being wheeled from one place to another.

B indicates a double-faced pattern-plate which (see Figs. 2, 4, 6, 7, 11 and 12) is removably secured, by means of screws $b$, to a holder or carrier C. The carrier C has two spaced parallel arms 21 which are rotatably mounted on a pivotal rod 22 arranged centrally between the ends and substantially horizontally and transversely of the framework A. The rod 22 pivots the arms 21 to normally upwardly shiftable posts or members 23 which are connected together by said rod and loosely embraced (see Fig. 3) by vertically arranged barrels or tubular members 24 arranged to guide said posts and integral or rigid with the framework A. Each post or rod-supporting member 23 rests at its lower end upon a block or seat-forming member 25 which is arranged within the lower end-portion of the guiding member 24 for said post and is provided with a laterally projecting stud 26 which extends through a slot 27 formed in one side and extending up and down said post-guiding member, and a nut 28 is screwed onto said stud externally of said post-guiding member and has its inner end (see also Fig. 14) overlapping the exterior of said post-guiding member. Obviously therefore upon loosening the nuts 28 the seat-forming members 25 are rendered free to be readjusted vertically, and said seat-forming members are secured in the desired adjustment by tightening said nuts. It will be observed therefore that the seat-forming members 25 are adjustable vertically, and consequently the support for the pattern-plate carrier C, which support consists of the rod 22, is elevated or lowered according as the posts or rod-supporting members 23 are elevated or lowered by the required readjustment vertically of the seat-forming members 25. The rod 22 and connected carrier C are consequently vertically adjustable, being elevated or lowered according as the seat-forming members 25 are readjusted vertically to elevate or lower them, but the posts or rod-supporting members 23 and connected carrier C are at all times free to shift vertically upwardly. The vertical adjustability and hereinbefore described application of the carrier C are features embodied in my present invention.

By the construction hereinbefore described it will be observed that the carrier C is oscillatorily supported and arranged to swing in a vertical plane, and obviously the pattern-plate B lies in a substantially horizontal position at one side of the axis of said carrier, as shown in Figs. 1, 2, 3, 4 and 6, to receive the lower flask-section D lower-end-up to be there supplied from above with molding sand $d$ and a mold-bottom E having the contour and dimensions required to render it capable of covering said sand and moving endwise of said flask-section, or is arranged, as shown in Figs. 8 and 9, in a substantially horizontal position over and spaced from a table G arranged at the opposite side of said axis with said mold-bottom resting on the table, according as the pattern-plate has been swung by the carrier C the extent required in the one or the other direction.

The pattern-plate, when it is arranged in position to receive the lower flask-section, preparatory to supplying molding sand to said flask-section, rests and is consequently supported at its outer or free end (see Figs. 1, 2 and 4) on two seat-forming members 30 spaced longitudinally of the axis of the carrier C. Each seat-forming member 30 (see Figs. 4, 15 and 16) is pivoted substantially horizontally, as at 31, to a bracket 32 and has its axis substantially parallel with the axis of the carrier C. Each seat-forming member 30 is arranged therefore to swing from and toward the axis of the pattern-plate-carrier and has an inwardly projecting arm 33 which has a lug 34 resting on said bracket in the inner position of said seat-forming member and coöperating with said bracket in forming a stop for limiting the movement of said seat-forming member during the inward swinging of said seat-forming member from its outwardly swung or outer position shown in dotted lines. Figs. 7 and 16 into its inwardly swung or inner position shown in Figs. 4, 6 and 15 and in solid lines, Figs. 7 and 16. Each seat-forming member 30 is also provided with a lug 35 which during the outward swinging of said seat-forming member from the position shown in Fig. 4 and in solid lines Fig. 16 into the position shown in dotted lines Figs. 7 and 16 comes into engagement, as shown in Fig. 16, with a stop-forming surface 39 of the bracket 32 supporting said seat-forming member and coöperates with said surface in forming a stop for limiting the movement of said seat-forming member during the outward swinging of said seat-forming member. Each bracket 32 (see Fig. 4) has a depending vertically arranged stem 36 extending into and adjustably endwise of a correspondingly arranged socket-forming member 37 with which the framework A is provided, which stem is secured in the desired vertical adjustment to said socket-forming member by a suitably applied set-screw 38. It will be observed therefore that the brackets 32, and consequently the seat-forming members 30, are adjustable vertically, and I would here remark that the vertical adjustability of said seat-forming members and the hereinbefore described application of said seat-forming members constitute a portion of my present invention.

By the construction hereinbefore described it will be observed that my improved machine comprises a table G arranged at one side of but below the axis of the pattern-plate-carrier C and has means arranged at the opposite side of said axis and comprising the seat-forming members 30 for supporting the pattern-plate at its free end when said pattern-plate is in position to receive the lower flask-section D of a mold, and Fig. 6 shows said flask-section mounted lower-end-up on said pattern-plate and filled with molding sand $d$, and Fig. 7 shows the hereinbefore mentioned mold-bottom E not only placed in position down-side-up over the body of sand $d$ but depressed somewhat into said flask-section to prevent displacement of said mold-bottom edgewise. Hence Fig. 7 shows said mold-bottom as having somewhat entered said flask-section D and slightly compressed the body of molding sand in said flask-section. When said mold-bottom has been applied, as shown in Fig. 7, the mold-bottom, the mold-bottom-surrounding sand-containing flask-section D and the pattern-plate are held together in any approved manner to facilitate swinging of the pattern-plate and connected flask-section and mold-bottom together to and over the table G, and said mold-bottom rests on said table upon swinging the pattern-plate and connected flask-section and mold-bottom to and over said table, as shown in Fig. 8. Fig. 8 therefore shows said mold-bottom right-side up and resting on the table G which is movable vertically as will hereinafter appear. Said mold-bottom is thick enough to extend downwardly from the body of molding sand in the flask-section D far enough beyond the lower extremity or externally of said flask-section to space said flask-section from the table G, as shown in Fig. 8, the extent required to permit the mold-bottom, during the elevation of said table as will hereinafter appear, to enter said flask-section far enough to effect the requisite compression of said body of molding-sand which is covered by the pattern-plate when the pattern-plate rests on said flask-section as shown in Fig. 8.

Means for preventing displacement of the mold-bottom E from the body of molding sand in the flask-section D during the swinging of said flask-section from the position shown in Fig. 7 into position over the table G, as shown in Fig. 8, are provided, and preferably consist of a frame which is rotatably mounted on the rod 22 and (see Figs. 7, 9, 17 and 18) comprises two rods 40 which form the central portion of said frame and in the operative position of said frame extend through recesses e formed in the under or outer side of said mold-bottom, and said frame preparatory and during the filling of the lower flask-section with molding sand, when the pattern-plate is in position resting on the seat-forming members 30, as shown in Figs. 1, 4 and 6, is arranged over the table G, as shown in Figs. 1 and 2, and has its members 40 resting on a cross-bar or member 41 of the framework A, (see also Figs. 4, 6, 11 and 12) but said frame, upon the application of the mold-bottom E to said flask-section, as shown in Fig. 7, after filling said flask-section with molding sand, is swung from the position shown in Figs. 1 and 2 into the position shown in Fig. 7, and in said last-mentioned position has the rods 40 thereof engaging the bottoms of the recesses e which extend across said bottom,—that is, between the axis of the pattern-plate-carrier C and the free end of the pattern-plate,—and consequently said rods extend, in the position shown in Fig. 7, between said axis and said end of the pattern-plate, but are spaced from said axis. Each rod 40 (see Figs. 7 and 17) is provided at its end adjacent the pattern-plate carrier C with an arm 42 which projects toward and is arranged radially relative to the axis of said carrier and extends into and is adjustable endwise of a socket-forming member 43 which is rotatably mounted on the rod 22 and provided with a suitably applied set-screw 44 employed in securing said arm in the desired adjustment. Each rod 40 (see Figs. 7, 8 and 18) is provided at its opposite end with an arm 45 which is substantially parallel with and arranged opposite the arm 42 of said rod and projects into a socket-forming member 46 formed on a cross-rod 47 which is employed in connecting the rods 40 together at their outer ends, and the arms 45 of the rods 40 are adjustable endwise of the socket-forming members 46 and secured in the desired adjustment by suitably applied set-screws 48. It will be observed therefore that the rods 40 or central and mold-bottom-engageable portion of said frame are adjustable at their inner ends from and toward the rod 22 to render said frame applicable to flask-sections which are shallower or deeper than the lower flask-section illustrated. Said frame is provided with a latch H which is rotatably mounted on the rod 47 centrally between the ends of said rod and provided with a shoulder h which in the operative position of the latch when the frame has been applied to the mold-bottom E, as shown in Fig. 7, overlaps the downwardly facing surface of the projecting outer or free end 49 of the pattern-plate and thereby holds the pattern-plate and the flask-section D together and causes the rods 40 to hold the mold-bottom in contact with the body of molding sand in said flask-section. It will be observed therefore that the cross-rod 47 is adjustable to render the latch H capable of being accurately positioned relative to the pattern-plate when the flask-section D is in position on the pattern-plate in the position of the pattern-plate shown in Fig. 7, and that said adjustability of the said cross-rod and connected latch accommodates the application of the latch to the pattern-plate during a readjustment of the rods 40 or central portion of said frame from or toward the rod 22 as required for a deeper or shallower flask-section than shown in Fig. 7. I would here remark that the adjustability of the rods 40 frame toward and from the axis of said frame and the adjustability of the latch H of said frame in accordance with the adjustability of said rods or mold-bottom-engageable portion of said frame constitute features of my present invention. The importance of the vertical adjustability of the rod or support 22 for the pattern-plate-carrier C will be obvious in view of the fact that the pattern-plate, when it has been swung into position over the table G, should lie substantially horizontally, and that the use of a lower flask-section deeper or shallower than shown in Fig. 8 necessitates such a readjustment vertically of the seat-forming members 25 as will insure a substantial horizontality of the pattern-plate in its position shown in Fig. 8 and space the pattern-plate in said position from the table G the extent required to accommodate the location between the table and the pattern-plate of the sand-body in said flask-section and the mold-bottom E. The pattern-plate, upon swinging it and the connected lower flask-section and mold-bottom to and over the table G, as shown in Fig. 8, is in position for the reception of the upper flask-section I of the mold, and said upper flask-section upon being mounted, in line vertically with the lower flask-section D, on the pattern-plate in said position of the pattern-plate, is filled with molding sand J, as shown in Fig. 8, whereupon a head K, borne by a holder or carrier L and employed to cover the body of molding sand supplied to the upper flask-section I and instrumental in compressing said sand, is actuated into position over said body and slightly depressed to cause it to somewhat enter said upper flask-section and thereby somewhat compress said sand. It will be observed that the pattern-plate-carrier C and connected pattern-plate are capable of being elevated independently of the head-carrier L and connected head in the position of the pattern-plate shown in Fig. 9, and I would here remark that the pattern-plate carrier and the table G are normally in their lower position. The upper flask-section I (see Fig. 13) is provided internally with cross-bars 50 instrumental in supporting the molding sand J compressed within said flask-section as will hereinafter appear.

The head K (see Figs. 4, 6, 7, 10, 11 and 12) is shown removably secured, by means of screws 51, to the carrier L which is oscillatorily supported and (see Figs. 2 and 3) has two substantially parallel spaced arms 52 arranged adjacent the ends of the rod 22, and each arm 52 is pivoted substantially horizontally, as at l, to a bracket 53 supported from the framework A. The arms 52 have their axes coincident and substantially parallel with the axis of the pattern-plate-carrier C. It will be observed therefore that the head-carrier L has its axis arranged in proximity to and substantially parallel with the axis of the pattern-plate-carrier C and is arranged to swing in a vertical plane. Preferably each bracket 53, as shown in Fig. 3, has a laterally and outwardly facing serrated surface 54 engaging a laterally and inwardly facing correspondingly serrated surface 55 with which the adjacent portion of the framework A is provided, and a bolt 56, which is arranged substantially horizontally and parallel with the axis of the carrier L, extends through a lateral slot 57 formed in said portion of said framework and through said bracket and has its head overlapping the inner side of said bracket. A nut 58 is screwed onto said bolt at the outer side of said portion of the framework, and a washer 59 is interposed between the framework and said nut. Upon loosening the nuts 58 the brackets 53 are rendered free to be readjusted vertically, and said brackets are secured in the desired adjustment by tightening said nuts. Obviously therefore the brackets 53, or support for the carrier L, are adjustable vertically, and consequently the carrier L is elevated or lowered according as said brackets are elevated or lowered by the required adjustment vertically of the said brackets.

The head K has the contour and dimensions required to render it capable of entering the upper flask-section I at the upper end of said flask-section and permitting said flask-section to be elevated independently of said head, but said head is in position covering the body of molding sand supplied to said flask-section when the pattern-plate is in position over the lower flask-section D arranged between the pattern-plate and the table G as shown in Fig. 9, or is arranged under the pattern-plate in a substantially horizontal position when the pattern-plate is in position resting on the seat-forming members 30, as shown in Figs. 1, 4, 6 and 7, according as said head has been swung the extent required in the one or the other direction.

It will be observed that the head-carrier L, when the head K is in position under the pattern-plate in the position of the pattern-plate shown in Figs. 1, 2, 4, 6 and 7, rests upon the arms 33 of the seat-forming members 30 and is therefore indirectly supported from the brackets 32 in said position of the pattern-plate. It will be observed also that said seat-forming members 30 project over the head K in said position of the pattern-plate and consequently project into the sweep of said head so that said head during its actuation from the position shown in Figs. 1, 2, 3, 4, 6 and 7 into the position shown in Fig. 9 comes into engagement with and swings or throws said seat-forming members outwardly into the position shown in dotted lines Figs. 7 and 16, and that in said position of said seat-forming members the arms 33 of said seat-forming members project into the sweep of the head-carrier L so that said carrier during the actuation of the head K from the position shown in Fig. 9 into the position shown in Figs. 1, 2, 3, 4, 6 and 7 comes into engagement with said arms and thereupon swings the seat-forming members 30 inwardly into the position shown in Figs. 1, 2, 4, 6 and 15 and in solid lines Figs. 7 and 16.

A not unimportant feature of my present invention consists in the provision of means for preventing sagging of the central portion of the pattern-plate when the pattern-plate is in position resting at its outer or free end on the seat-forming members 30, and the means shown for preventing said sagging of said portion of the pattern-plate in said position of the pattern-plate (see Figs. 1, 4 and 13) comprise two pins or members M movable with and shiftable endwise independently of the head K. The pins M extend through holes 61 in the central portion of the head K and are spaced longitudinally of the axis of the carrier L. Each pin M has a head $m$ countersunk within the sand-compressing head K and arranged flush with and participating in forming the face of said sand-compressing head when the latter is in the position shown in Figs. 9 and 13. The pins M are arranged substantially perpendicularly to the head K and extend beyond the back of said head. Nuts 62 are screwed onto the pins M opposite and spaced from the back of the head K, and spiral springs 63 are coiled around said pins and confined between said nuts and said back and act to retain said pins in the position in which their heads m are flush with the face of the head K. The pins M, when the head K is in position under the pattern-plate and when the pattern-plate rests on the seat-forming member 30, as shown in Figs. 3 and 4, above said head, rest at their lower ends on brackets 64 supported from a cross-bar 65 of the framework A. Each bracket 64 is provided (see Figs. 3, 4 and 5) with a vertically arranged slot 66 extending laterally therethrough, as shown in Figs. 4 and 5, and a bolt 67, as shown in Figs. 4 and 5, has its shank extending laterally through said cross-bar and beyond the bracket-facing side of the cross-bar and through the slot 66 in said bracket and has its head at the opposite side of the cross-bar and a nut 68 is screwed on the free end of said shank, and a washer 69 is interposed between said nut and said bracket. Upon loosening the nuts 68 the brackets 64 are rendered free to be readjusted vertically, and said brackets are secured in the desired adjustment by tightening said nuts. It will be observed that the brackets 64 have such arrangement relative to the pins M of the head K that said pins during the actuation of said head into the position shown in Figs. 3 and 4 come into engagement with the brackets 64 and are elevated by said brackets against the action of the springs 63 and far enough to cause the heads of said pins to make contact with and brace or support the central portion of the pattern-plate when the pattern-plate is in position resting on the seat-forming members 30.

By the construction hereinbefore described it will be observed that the vertical adjustability of the brackets 53 or support for the head-carrier L renders said carrier, and consequently the head K, adjustable to accommodate the use of flask-sections which are deeper or shallower than the flask-sections illustrated, and that said head, when it is in position under the pattern-plate in the position of the pattern-plate shown in Figs. 1, 2, 3, 4, 6 and 7, is out of the way but accommodates the requisite arrangement of the hereinbefore described means employed for preventing sagging of the central portion of the pattern-plate, and I would here remark that said head and its application and arrangement relative to the table G and the application of the pattern-plate constitute invaluable features of my present invention.

By the construction hereinbefore described it will be observed that my improved mold-making machine not only comprises a table arranged at one side of and below the axis of the pattern-plate-carrier which is arranged to swing in a vertical plane, that during the operation of the machine the pattern-plate and connected lower flask-section and mold-bottom are swung to and over said table, and that said mold-bottom rests on said table when the pattern-plate and connected lower flask-section and mold-bottom have been swung to and over said table, as shown in Fig. 8, but that my improved machine also comprises an oscillatorily supported holder or carrier bearing a head K which is arranged to swing in a vertical plane and has its axis substantially parallel with the axis of the pattern-plate-carrier when the pattern-plate is in position at the opposite side of said axis for receiving the lower flask-section, as shown in Fig. 6, that said head during the operation of the machine is arranged to be swung into position over the upper flask-section, as shown in Fig. 9, for participation in the compression of the sand-body in the upper flask-section mounted on the pattern-plate upon swinging the pattern-plate and connected flask-section and mold-bottom to and over the aforesaid table, and I would here remark that upon swinging said head into its last-mentioned position the table is elevated to effect the elevation of the mold-bottom, as shown in Figs. 10 and 13, but before the elevation of said table the latch H is thrown into an inoperative position in which the latch is out of engagement with the pattern-plate, as shown in Fig. 10. It will be observed that notwithstanding the movability of the mold-bottom upwardly independently of the lower flask-section there is enough friction between the sand-body in said flask-section and said flask-section to effect an upward movement of said flask-section, the pattern-plate on said flask-section and the upper flask-section independently of the head K and thereby reduce the distance between said head and the pattern-plate, but the mold-bottom, being movable upwardly independently of the pattern-plate, moves farther during the elevation of the table G than the lower flask-section, pattern-plate and upper flask-section so as to reduce the distance between the pattern-plate and the mold-bottom.

Means for preventing upward movement of the head K during the elevation of the pattern-plate and upper flask-section are provided and comprise two latches P which are pivoted by the substantially horizontally arranged removable pins 71 to the head-carrier L at the free end of said carrier and have their axes substantially parallel with the axis of said carrier. Each latch P is arranged therefore to swing in a vertical plane and, when the head K is in a position below the pattern-plate in the position of the pattern-plate shown in Figs. 1, 2, 4, 6 and 7, projects upwardly and outwardly from said head, as shown in Fig. 1, and abuts below its axis against a stop-forming shoulder 72 formed on the carrier L, as shown in Fig.

19, to prevent said latch from dropping downwardly into a position in which it might be in the way. The latches P, upon the actuation of the head K into the position shown in Figs. 9, 10, 11, and 12, are arranged in a position in which they project downwardly from the carrier, and each latch P is provided at its free end with a shoulder 73 which faces upwardly in the last-mentioned position of the latch and overlaps a downwardly facing surface 74 formed on the framework A so as to coöperate with said framework in preventing upward displacement of said head in the position of the head shown in Fig. 9 during the upward movement of the pattern-plate and upper flask-section independently of said head. It will be observed therefore that during the elevation of the table G the mold-bottom, the pattern-plate and the head K are relatively readjusted as required to reduce the distance between the table and the pattern-plate and between the pattern-plate and said head so as to effect a compression of the sand-bodies in both flask-sections.

As shown in Fig. 19, the pin 71 employed in pivoting a latch P to the carrier L engages the central hole of three holes 75 formed in and spaced longitudinally of said latch, and hence by removing said pin from said hole and pivoting said latch to said carrier at one of the other of said holes, said latch is readjusted longitudinally.

To each arm 52 of the head-carrier L is attached one end of a counterbalance spiral spring Q preferably removably by a suitably applied set-screw 93, as shown in Figs. 1, 4 and 9, and said spring is attached at its other end to the framework A in any approved manner. The head K is preferably arranged exactly horizontally when said head has somewhat entered the upper flask-section, as shown in Fig. 9, and the springs Q act to retain said head in the horizontal position shown in Fig. 9. To facilitate movement of the latches P into their operative position in which the shoulder 73 of each latch P overlaps the adjacent surface 74 of the framework A the head K is depressed somewhat farther into the upper flask-section than shown in Fig. 9, whereupon the positioning of said head horizontally by the springs Q upon such depression of the head insures contact between the shoulder 73 of each latch P and the adjacent surface 74 of the framework A, as shown in Fig. 9, but of course leaves some space 76 between said head and the sand-body J which is compressed somewhat during said depression of said head.

The table G (see Figs. 1, 2, 8, 9, 10, 11 and 13) is provided at the under side of its central portion with two laterally spaced depending vertically arranged stems 77 which extend into correspondingly arranged cylinders 78 which constitute means for guiding said stems during the vertical movement of the table and are rigid with the framework A. Each stem 77 rests in the lower position of the table on a seat 79 formed in the lower end of the stem-surrounding cylinder, as shown in Fig. 8. The cylinders 78 are arranged above but centrally between two horizontally arranged parallel rock-shafts 80 which extend from side to side of the machine and are supported from the framework A, and each shaft 80 is provided centrally between its ends with an upwardly projecting arm 81. The arms 81 of the two shafts 80 are operatively connected together by a suitably applied link 82 which is arranged horizontally and at a right angle to said shafts and extends between the cylinders 78. Each shaft 80 is provided with two arms 83 which project laterally of the shaft and are arranged between the arm 81 of said shaft and opposite ends, respectively of the shaft and substantially at a right angle to said arm 81. The arms 83 of the shafts 80 project in the same direction and are operatively connected by suitably applied upright links 84 with the table G. Each shaft is provided with the lower section 85 of a collapsible lever for operating said shaft. The operating levers of the shafts 80 are arranged at opposite sides respectively of the machine, as shown in Figs. 1, 2, 8 and 9, and each lever has an upper handle-forming section 86 which is pivoted substantially horizontally, as at 87, to the lower section 85 of the lever and has its axis substantially parallel with the shafts 80. The upper section 86 of each lever normally depends from the upper end of the lower section 85 of the lever, as shown in Figs. 1 and 8 and in solid lines in Fig. 9. The lower section 85 of each lever has an upper end face 88 extending from adjacent the axis of the upper section 86 of the lever in the direction in which the lever is actuated to elevate the table, and said upper section of the lever is provided with a shoulder 89 arranged to abut against said end face upon swinging said upper section of the lever upwardly, as shown in dotted lines in Fig. 9, into its operative position preparatory to swinging the lever in the direction required to elevate the table G, and Figs. 10 and 13 illustrating the table as elevated of course show the upper section of a lever in its operative position. The machine illustrated is therefore designed more especially for making large molds and to be operated by two attendants stationed at opposite sides respectively of the machine.

The upper flask-section and the compressed sand-body in said flask-section, as shown in Figs. 10 and 13, form the cope of the mold. The lower flask-section and the compressed sand-body in said flask-section, as shown in Figs. 10 and 13, and the mold-bottom, form the drag of the mold, and it will be observed therefore that in my improved machine the drag and the cope are simultaneously completed, and I would here remark that upon the formation of the drag and the cope as shown in Figs. 10 and 13 the mold-bottom and the lower flask-section are preferably fastened together in any approved manner, but description and illustration in this specification, of means for fastening the mold-bottom and the lower flask-section together upon the formation of the drag, as such fastening means are not involved in my present invention, are not considered necessary.

A not unimportant feature of my present invention consists in the provision of means instrumental in holding the upper flask-section, and consequently the cope, elevated independently of the pattern-plate, as shown in Fig. 11, during the descent of the table G by gravity into its lower and normal position, and (see Figs. 1, 2, 8, 9, 10 and 13) the means shown for holding the cope elevated independently of the pattern-plate comprise a pair of seat-forming members R for supporting the upper flask-section adjacent the inner end and independently of the pattern-plate upon the formation of the cope, and also a pair of seat-forming members r for supporting said flask-section adjacent the outer or free end and independently of the pattern-plate upon the formation of said cope. The seat-forming members R and r are pivoted substantially horizontally, as at 91, to the framework A and arranged to swing in a vertical plane, having their axes substantially parallel with the axis of the head-carrier L. The two seat-forming members R and also the two seat-forming members r are spaced longitudinally of the axis of the carrier L and arranged at opposite sides respectively of the table G, as shown in Fig. 2. The seat-forming members R extend far enough above the table G to cause them to project a suitable distance above the pattern-plate when the pattern-plate is in the position shown in Figs. 8, 9, 10, 11 and 13. The seat-forming members R are operatively connected with the seat-forming members r by links S. The links S are attached to the seat-forming members r above the fulcrums of said seat-forming members and are attached to the seat-forming members R below the fulcrums of said last-mentioned members. Obviously, therefore, swinging of the seat-forming members R in the direction required to move their upper ends toward the seat-forming members r will result in swinging the last-mentioned members in the direction required to move their upper ends toward the seat-forming members R.

Each arm 52 of the carrier L is provided with a resilient member 92 which is shown attached to said arm by the screw 93 employed in attaching the adjacent spring Q to said arm and extends circumferentially of the axis of said carrier from the point of attachment of said resilient member to said arm in the direction in which said carrier is swung in swinging the head K from the position shown in Figs. 9, 10, 11, 12 and 13 into the position shown in Figs. 1, 2, 3, 4, 6, and 7. Each resilient member 92, in the position of the head K shown in Figs. 1, 2, 3, 4, 6 and 7 is nearest the axis of the carrier L at the point of attachment of the said resilient member to the connected arm 52 and is gradually spaced farther from said axis in the direction of the free end of said resilient member, so that said resilient member is arranged eccentrically relative to said axis.

The two pairs of seat-forming members R and r, in the inoperative position of said seat-forming members, as shown in Figs. 1, 2 and 8, are spaced far enough apart above the table G to accommodate the relative arrangement over said table of the mold-bottom, lower flask-section, pattern-plate and upper flask-section, as shown in Fig. 8, and said seat-forming members in said position extend, as shown in Fig. 8, opposite but are spaced from the longitudinal edges of ribs 94 formed on and externally of the upper flask-section and are adapted to be swung toward each other and into contact with said edges of said ribs, as will hereinafter appear.

The arrangement of the resilient members 92 of the arms 52 of the head-carrier L is such relative to the seat-forming members R that said resilient members, during the actuation of the head K from the position shown in Figs. 1, 2, 3, 4, 6 and 7 into the position shown in Fig. 9, come into engagement with the upper end-portions of said seat-forming members and thereupon actuate said seat-forming members during said movement of said head against the longitudinal edge of the adjacent rib 94 of the upper flask-section and are placed under tension during said actuation of said seat-forming members, and Fig. 9 shows said seat-forming members as having been actuated by the resilient members 92 against said rib, and it will be observed that the relative arrangement of the parts is such that during the actuation of the seat-forming members R against said rib, the seat-forming members r, as shown in Fig. 9, are actuated into contact with the longitudinal edge of the rib 94 adjacent said last-mentioned seat-forming members. During the elevation of the upper flask-section by the pattern-plate during the hereinbefore described relative readjustment of the pattern-plate, the table G, and the head K, said flask-section moves upwardly far enough to bring its external ribs or projecting members 94 somewhat above the seat-forming members R and r, as shown in Fig. 10, and as soon as said flask-section has been elevated the extent required to bring said projecting members above said seat-forming members, the resilient members 92, being under tension, effect a movement of the seat-forming members R farther in the direction required to cause the upper ends of the last-mentioned seat-forming members to move under the adjacent rib or projecting member 94 of the upper flask-section, and obviously said movement of the seat-forming members R results in the movement of the seat-forming members r to bring the upper ends of the last-mentioned seat-forming members in under the rib or projecting member 94 adjacent the last-mentioned seat-forming members, as shown in Fig. 10. Fig. 10 therefore shows the seat-forming members R and r in an operative position. It will be observed that as the upper flask-section during its upward movement moves far enough to space its ribs or projecting members 94 upwardly from the seat-forming members R and r, as shown in Fig. 10, the cope, consisting of the flask-section and the body of compressed sand in said flask-section, will, upon the completion of the upward movement of said flask-section, have to descend somewhat to seat said flask-section, and consequently the cope, on said seat-forming members, as shown in Figs. 11 and 12, preparatory to the separation of the pattern-plate from the cope and the separation of the drag from the pattern-plate, as shown in Fig. 11, or preparatory to the separation only of the drag from the pattern-plate, as shown in Fig. 12. Upon the completion of the drag and the cope, as shown in Fig. 10, the table G is permitted to descend by gravity into its lower and normal position, shown in Figs. 11 and 12. Fig. 11 illustrates the drag and the pattern-plate as having lowered by gravity with the table G, but as the mold-bottom, upon the formation of the drag, will have moved farther into the lower flask-section than before the compression of the sand-bodies in the flask-sections during the requisite relative readjustment of the table, pattern-plate and head G, the drag is obviously spaced from the pattern-plate in the lower and normal position of the table, as shown in Fig. 11, and of course the pattern-plate in the position shown in Fig. 11 is also separated from the cope because the latter is supported from the seat-forming members R and r independently of the pattern-plate and prevented from descending as far as the pattern-plate. The pattern-plate, upon descending into the position shown in Fig. 11, is obviously supported at its inner end from the seat-forming members 25 through the medium of the rod 22 and posts 23, as said posts in said position of the pattern-plate rest upon said seat-forming members, but to prevent the pattern-plate from descending at its outer or free end after the descent of the pattern-plate at its inner end has been arrested during the descent of the table into its normal and lower position, as shown in Fig. 11, means for supporting the pattern-plate at its outer or free end independently of the lower flask-section D as soon as the descent of the pattern-plate at its inner end has been arrested are provided (see Figs. 1, 2, 8 and 11) and comprise brackets T borne by the seat-forming members r, which brackets are out of the way in the inoperative position of said seat-forming members r, as shown in Figs. 1, 2 and 8, but are in position next below the portion 49 of the pattern-plate and form seats for the pattern-plate at the outer or free end of the pattern-plate upon the descent of the pattern-plate into the position shown in Fig. 11. It will be observed that each seat-forming member r is provided at one side thereof with a bracket T which (see Figs. 8 and 20) is provided with a slot t extending laterally through and up and down said bracket, and a bolt U, as shown in Figs. 8 and 20, has its shank extending horizontally and laterally through said seat-forming member and beyond the bracket-facing side of said seat-forming member and through the slot t in said bracket and has its head abutting against the opposite side of said seat-forming member, and a nut u is screwed onto the free end of said shank and clamps the bracket to said seat-forming member. Upon loosening the nuts u the brackets T are rendered free to be readjusted to elevate or lower them, and said brackets are secured in the desired adjustment by tightening said nuts. The descent of the cope from the position shown in Fig. 10 onto the seat-forming members R and r, as shown in Fig. 11, separates the sand-body of the cope from the head K enough to permit depression of said head-carrier L the extent required to sufficiently loosen the latches P at their shoulders 73 relative to the downwardly facing surface 74 of the framework A and thereby render said latches free to be rendered inoperative preparatory to swinging the head K from the position shown in Fig. 11 into the position shown in Figs. 1, 2, 3, 4, 6 and 7, and upon said swinging of said head the cope is rendered free to be removed from the machine. Having withdrawn the drag from the pattern-plate and the pattern-plate from the cope, as shown in Fig. 11, the cope, upon swinging the head K from the position shown in Fig. 11 into the position shown in Figs. 1, 2, 3, 4, 6 and 7, is removed, whereupon the pattern-plate is swung from the position shown in Fig. 11 into the position shown in Figs. 1, 2, 3, 4, 6 and 7 for the reception of a lower flask-section lower-end-up for making the next mold, whereupon the drag is removed from the table G. I would here remark that the pattern-plate is provided (see Figs. 1, 2 and 11) in proximity to the pattern-plate-carrier with two shoulders 95 which are formed at opposite side edges respectively of the pattern-plate and face toward the axis of said carrier. The seat-forming members R in their inoperative position shown in Figs. 1, 2 and 8 are arranged out of the sweep of said shoulders on the pattern-plate but have their upper end-portions arranged within said sweep in the operative position of said seat-forming members so that said shoulders shall during the swinging of the pattern-plate from the position shown in Fig. 11 into the position shown in Figs. 1, 2, 3, 4, 6 and 7 come into engagement with the said seat-forming members and effect the actuation of said seat-forming members and the connected seat-forming members r into their inoperative position.

It will be observed that the bolt U for each bracket T is spaced from the lower end of the slot t in said bracket, as shown in Figs. 8 and 11, and hence said bracket is not shown in its lowermost position in Fig. 11. Suppose, for instance, that, as shown in dotted lines Fig. 12, the pattern-plate comprised projections 60 for forming cavities 70 in the sand-body of the drag, which projections have such dimensions that the pattern-plate, if lowered as far as shown in Fig. 11, could not be swung from the position shown in Fig. 11 into the position shown in Figs. 1, 2, 3, 4, 6 and 7 without resulting in mutilation of said sand-body. The importance of the hereinbefore described adjustability of the brackets T of the seat-forming members r is therefore obvious, and said brackets are readjusted, for a pattern-plate having said projections, as required to elevate said brackets, as shown in Fig. 12, far enough to prevent the pattern-plate from descending or separating at its outer or free end from the cope during the withdrawal of the drag from the pattern-plate during the descent of the table into its lower and normal position. Fig. 12 shows the pattern-plate and the drag spaced apart far enough to free the projection 60 (shown in dotted lines) from the sand-body of the drag, but to adequately space the pattern-plate from the drag from end to end of the pattern-plate, as shown in Fig. 12, it is also not unimportant to provide means for preventing the separation of the pattern-plate at its inner end from the cope, and means for preventing the descent of the pattern-plate-carrier, when the pattern-plate is in the position shown in Fig. 12, is therefore provided and (see Figs. 2, 3 and 10) comprise a short rock-shaft W which is arranged substantially horizontally and at a right angle to the rod 22 and centrally between the post-guiding members 24. Said shaft is supported from the framework A in any approved manner and provided, with a lever w for oscillating the shaft and also provided with two arms 96 arranged radially at diametrically opposite sides respectively of the shaft. Between the shaft W and each post 23 is arranged a clamping member x which is pivoted horizontally, as at 97, to the adjacent post-guiding members 24 and has its axis parallel with the shaft W, and said clamping member is arranged to clamp said post to said post-guiding member which is slotted, as at 98, to accommodate the location and operation of said clamping member. Said clamping member is operatively connected with a link y which extends from said clamping member toward the shaft W. The links y are operatively connected with opposite arms 96 respectively of the shaft W. The clamping members x are shown in an inoperative position in Fig. 3, but the relative arrangement of the parts is such that said clamping members are rendered operative and thereby caused to clamp the posts 23 to the post-guiding members 24 upon oscillating the shaft W in the direction and to the extent required to bring its arms 96 into the position shown in dotted lines. Of course preparatory to rendering the clamping members x operative the set-screws 44 of the frame comprising the rods 40 are loosened to permit lowering of said frame independently of the pattern-plate. I would also remark that the upper flask-section is shown beveled, as at 99, at its upper end as and where required to facilitate swinging of the head K from the position shown in Figs. 11 and 12 into the position shown in Figs. 1, 2, 3, 4, 6 and 7.

What I claim is:—

1. In a mold-making machine, the combination, with a framework; a table for supporting a mold-bottom which is capable of entering and moving endwise of the lower flask-section of a mold and thick enough to extend externally of said flask-section when the latter has been supplied with molding sand; a suitably supported double-faced pattern-plate movable into a position in which it covers said flask-section when the latter is arranged over the aforesaid table, of a carrier supported from the aforesaid framework, a head adapted to cover a body of molding sand in the upper flask-section of the mold when said upper flask-section has been mounted on the pattern-plate in the aforesaid position of the pattern-plate, which head is borne by said carrier and capable of entering the upper flask-section upon being actuated into a position in which it covers said last-mentioned body of molding-sand, said head in its said position, the pattern-plate in its aforesaid position, and the table being capable of relative readjustment to reduce the distance between the table and the pattern-plate and between the pattern-plate and said head.

2. In a mold-making machine, the combination, with a table for supporting a mold-bottom; an oscillatorily supported holder or carrier for a pattern-plate, which carrier is arranged to swing in a vertical plane, and a double-faced pattern-plate borne by said carrier and arranged to be swung by said carrier into position over the aforesaid table, of another oscillatorily supported carrier arranged to swing in a vertical plane, and a head borne by said last-mentioned carrier and arranged to be swung by its carrier into position over the pattern-plate in the aforesaid position of the pattern-plate, the pattern-plate in its said position, the head in its aforesaid position, and the table being capable of relative readjustment to reduce the distance between the table and the pattern-plate and between the pattern-plate and the head.

3. In a mold-making machine, two laterally spaced posts which are free to move upwardly; a holder or carrier for a pattern-plate, which carrier is pivotally connected to said posts and arranged to swing in a vertical plane; vertically arranged tubular members loosely embracing and instrumental in guiding the said posts; vertically adjustable blocks arranged within the post-guiding members and under and forming seats for the posts, and means for securing said blocks to the post-guiding members in the desired adjustment of the blocks.

4. In a mold-making machine, the combination, with two vertically adjustable spaced members; a holder or carrier for a pattern-plate, which carrier is pivotally connected to said spaced members and arranged to swing in a vertical plane; a table arranged at one side of and below the axis of said carrier; a pattern-plate borne by said carrier and being arranged in a substantially horizontal position over said table, or being arranged in a substantially horizontal position at the opposite side of said axis, according as the pattern-plate has been swung by said carrier the extent required in the one or the other direction, of vertically adjustable brackets arranged at the last-mentioned side of said axis and provided with seat-forming members instrumental in supporting the pattern-plate in the last-mentioned position of the pattern-plate.

5. In a mold-making machine, the combination, with an oscillatorily supported holder or carrier for a pattern-plate, which carrier is arranged to swing in a vertical plane; seats arranged at one side of the axis of said carrier for supporting a pattern-plate; a table arranged at the opposite side of said axis for supporting a mold-bottom; a pattern-plate borne by the aforesaid carrier and lying in a substantially horizontal position at the first-mentioned side of the aforesaid axis to receive the lower flask-section of a mold lower-end-up to be there supplied from above with molding sand and a mold-bottom, or being arranged in a substantially horizontal position over the aforesaid table with said mold-bottom resting on said table, according as the pattern-plate has been swung by said carrier the extent required in the one or the other direction, of an oscillatorily supported frame having a portion thereof adapted to extend across the outer side of said mold-bottom when the aforesaid flask-section and said mold-bottom are assembled over the pattern-plate in the first-mentioned position of the pattern-plate, said frame being provided with means for holding the pattern-plate to said flask-section, the aforesaid portion of said frame being adjustable relative to the pattern-plate.

6. In a mold-making machine, the combination, with a substantially horizontally arranged pivotal rod; a holder or carrier for a pattern-plate, which carrier has bearing on said rod and is arranged to swing in a vertical plane; means arranged at one side of said rod for supporting a pattern-plate; a table arranged at the opposite side of said rod for supporting a mold-bottom; a pattern-plate borne by the aforesaid carrier and lying in a substantially horizontal position at the first-mentioned side of the aforesaid rod to receive the lower flask-section of a mold lower-end-up to be there supplied from above with molding sand and said mold-bottom, or being arranged in a substantially horizontal position over the table with said mold-bottom resting on the table, according as the pattern-plate has been swung by said carrier the extent required in the one or the other direction, of a frame rotatably mounted on said rod and comprising two rods which are adapted to engage the outer side of the mold-bottom upon the assemblage of the flask-section and the mold-bottom over the pattern-plate in the first-mentioned position of the pattern-plate and extend in their mold-bottom-engaging position between the aforesaid pivotal rod and the free end of the pattern-plate, said mold-bottom-engageable rods being adjustable at their inner ends from and toward said pivotal rod, and a cross-rod which connects the two mold-bottom-engageable rods at their outer ends together and is provided with a latch for holding the pattern-plate and the flask-section together, said cross-rod being adjustable to accurately position the latch relative to the pattern-plate.

7. In a mold-making machine, a pivoted holder or carrier arranged to swing in a vertical plane; a head borne by said carrier and arranged in a substantially horizontal position at one side of the axis of said carrier, or being arranged substantially horizontally at the opposite side of said axis and in position to participate in the compression of a body of molding sand, according as said head has been swung by said carrier the extent required in the one or the other direction, and means arranged at the first-mentioned side of said axis for supporting said head in the first - mentioned position of the head.

8. In a mold-making machine, an oscillatorily supported holder or carrier arranged to swing in a vertical plane; a pattern-plate borne by said carrier and lying in a substantially horizontal position at one side of the axis of said carrier, or being arranged in a substantially horizontal position at the opposite side of said axis, according as the pattern-plate has been swung by said carrier the extent required in the one or the other direction; another oscillatorily supported holder or carrier having its axis substantially parallel with the aforesaid axis, and a head borne by the last-mentioned carrier and arranged under the pattern-plate in the first-mentioned position of the pattern-plate, or being arranged substantially horizontally over and spaced from the pattern-plate in the second-mentioned position of the pattern-plate, according as said head has been swung by said last-mentioned carrier the extent required in the one or the other direction, the pattern-plate-carrier and the head-carrier being capable of relative readjustment to reduce the distance between the head and the pattern-plate in the second-mentioned position of the pattern-plate.

9. In a mold-making machine, an oscillatorily supported holder or carrier arranged to swing in a vertical plane; a pattern-plate borne by said carrier and lying in a substantially horizontal position at one side of the axis of said carrier, or being arranged in a substantially horizontal position at the opposite side of said axis, according as the pattern-plate has been swung by said carrier the extent required in the one or the other direction; another oscillatorily supported holder or carrier having its axis substantially parallel with the aforesaid axis, and a head borne by the last-mentioned carrier and arranged under the pattern-plate in the first-mentioned position of the pattern-plate, or being arranged substantially horizontally over and spaced from the pattern-plate in the second-mentioned position of the pattern-plate, according as said head has been swung by said last-mentioned carrier the extent required in the one or the other direction, the pattern-plate-carrier being shiftable upwardly independently of the head-carrier.

10. In a mold-making machine, the combination, with an oscillatorily supported holder or carrier arranged to swing in a vertical plane; a pattern-plate borne by said carrier and arranged to be swung by said carrier in opposite directions; another oscillatorily supported holder or carrier having its axis substantially parallel with the axis of the pattern-plate-carrier, and a head borne by the second-mentioned carrier and arranged to be swung by said second-mentioned carrier in opposite directions, said head in one position thereof being arranged substantially horizontally under the pattern-plate in one position of the pattern-plate, of supporting means for the head-carrier tern-plate in the aforesaid position of the pattern-plate and head-carrier, said supporting means comprising pivoted seat-forming members having inwardly projecting arms which in the inwardly swung position of said seat-forming members are arranged to afford support to the head-carrier in the aforesaid position of the head, and stops for limiting movement of said seat-forming members in opposite directions, said seat-forming members in their aforesaid position extending over and into the sweep of the head and being arranged to support the pattern-plate in the aforesaid position of the pattern-plate, and the aforesaid arms projecting into the sweep of the head-carrier in the outwardly swung position of said seat-forming members.

11. In a mold-making machine, the combination, with an oscillatorily supported holder or carrier arranged to swing in a vertical plane; a pattern-plate borne by said carrier and adapted to be swung by said carrier into a substantially horizontal position in opposite directions; another oscillatorily supported holder or carrier having its axis substantially parallel with the axis of the pattern-plate-carrier, and a head borne by the second-mentioned carrier and arranged to be swung by said second-mentioned carrier in opposite directions, said head in one position thereof being arranged substantially horizontally under the pattern-plate in one position of the pattern-plate, of supporting means for the head-carrier and pattern-plate in said positions of the pattern-plate and head-carrier, said supporting means comprising substantially horizontally pivoted seat-forming members arranged to swing from and toward the axis of the pattern-plate-carrier and having inwardly projecting arms which in the inwardly swung position of said seat-forming members are arranged to support the head-carrier at its free end in the aforesaid position of the head, and stops for limiting movement of said seat-forming members in opposite directions, said seat-forming members in their aforesaid position extending over and into the sweep of the head and being arranged to support the pattern-plate in the aforesaid position of the pattern-plate, and the aforesaid arms projecting into the sweep of the head-carrier in the outwardly swung position of said seat-forming members.

12. In a mold-making machine, the combination, with an oscillatorily supported holder or carrier arranged to swing in a vertical plane; a pattern-plate borne by said carrier and adapted to be swung by said carrier into a substantially horizontal position in opposite directions; another oscillatorily supported holder or carrier having its axis substantially parallel with the axis of the pattern-plate-carrier, and a head borne by the second-mentioned carrier, said head in one position of the head-carrier being arranged substantially horizontally under the pattern-plate in one position of the pattern-plate, of vertically adjustable brackets arranged adjacent the free ends of the head-carrier and pattern-plate in said positions of the pattern-plate and head-carrier; seat-forming members pivoted substantially horizontally to said brackets and arranged to swing from and toward the axes of the head-carrier and pattern-plate-carrier and having inwardly projecting arms which have lugs which in the inwardly swung position of said seat-forming members are arranged to rest on the brackets, which arms in said position of said seat-forming members are arranged to support the head-carrier at its free end in the aforesaid position of the head-carrier, said seat-forming members in their aforesaid position extending over and into the sweep of the head and being arranged to support the pattern-plate in the aforesaid position of the pattern-plate.

13. In a mold-making machine, an oscillatorily supported holder or carrier arranged to swing in a vertical plane; a pattern-plate borne by said carrier and arranged to be swung by said carrier into a substantially horizontal position in opposite directions; endwise shiftable pins arranged in an upright position under and bracing the central portion of the pattern-plate in one position of the pattern-plate, and vertically adjustable seats for said pins in the last-mentioned position of the pattern-plate.

14. In a mold-making machine, the combination, with an oscillatorily supported holder or carrier arranged to swing in a vertical plane; a pattern-plate borne by said carrier; another oscillatorily supported holder or carrier arranged to swing in a vertical plane and having its axis substantially parallel with the axis of the pattern-plate-carrier, and a head borne by the second-mentioned carrier, said head in one position thereof being arranged substantially horizontally under the pattern-plate in one position of the pattern-plate, of members arranged substantially perpendicularly to said head and extending from within to and beyond the back of the head and movable with the head and shiftable endwise independently of the head, and means for effecting the actuation, during the swinging of said head into the aforesaid position, of said endwise shiftable members in the direction required to cause said members to project far enough beyond the face of the head to afford support to the pattern-plate in the aforesaid position of the pattern-plate.

15. In a mold-making machine, the combination, with an oscillatorily supported holder or carrier arranged to swing in a vertical plane; a pattern-plate borne by said carrier; another oscillatorily supported holder or carrier arranged to swing in a vertical plane and having its axis substantially parallel with the axis of the pattern-plate-carrier, and a head borne by the second-mentioned carrier, said head in one position thereof being arranged substantially horizontally under the pattern-plate in one position of the pattern-plate, of pins extending substantially perpendicularly to said head and extending from within to and beyond the back of the head and movable with the head and shiftable endwise independently of the head, nuts screwed onto said pins opposite and spaced from said back; spiral springs coiled around said pins and confined between said back and said nuts, and seats for said pins in the aforesaid position of said head, which seats are arranged to effect the actuation of said pins, during the swinging of said head into its said position, endwise against the action of the springs and in the direction required to cause the pins to project beyond the face of said head and afford support to the pattern-plate in the aforesaid position of the pattern-plate.

16. In a mold-making machine, the combination, with an oscillatorily supported holder or carrier arranged to swing in a vertical plane; a pattern-plate borne by said carrier; another oscillatorily supported holder or carrier arranged to swing in a vertical plane and having its axis substantially parallel with the axis of the pattern-plate-carrier, and a head borne by the second-mentioned carrier, said head in one position thereof being arranged substantially horizontally under the pattern-plate in one position of the pattern-plate, of members extending substantially perpendicularly to said head and extending from within to and beyond the back of the head and movable with the head and shiftable endwise independently of the head, and vertically adjustable seats for said pins in the aforesaid position of said head, which seats are arranged to effect the actuation of said endwise shiftable members, during the swinging of said head into its said position, in the direction required to cause said members to project beyond the face of the head and afford support to the pattern-plate in the aforesaid position of the pattern-plate.

17. In a mold-making machine, the combination, with an oscillatorily supported holder or carrier arranged to swing in a vertical plane; a pattern-plate borne by said carrier; another oscillatorily supported holder or carrier arranged to swing in a vertical plane and having its axis substantially parallel with the axis of the pattern-plate-carrier, and a sand-compressing head borne by the second-mentioned carrier, said head in one position thereof being arranged substantially horizontally under the pattern-plate in one position of the pattern-plate, of pins arranged substantially perpendicularly to said head and extending from within the head to and beyond the back of the head, which pins are movable with said head and shiftable endwise independently of said head, said pins having heads which are countersunk within the sand-compressing head and flush with the face of said head before swinging said head into its aforesaid position, and seats for said pins in said position of the sand-compressing head, which seats are arranged to effect the actuation of said pins, during said swinging of the sand-compressing head, endwise in the direction required to cause the pins to project beyond the face of the sand-compressing head and afford support to the pattern-plate in the aforesaid position of the pattern-plate.

18. In a mold-making machine, a framework; an oscillatorily supported holder or carrier arranged to swing in a vertical plane; a head borne by said carrier and capable of entering the upper flask-section of a mold, said head being arranged substantially horizontally at one side of the axis of said carrier and in position to enter said flask-section upon having swung the head in the direction and to the extent required; springs acting to retain the head in said position, and latches pivoted substantially horizontally to the aforesaid carrier at the free end of the carrier and having their axes substantially parallel with the axis of the carrier, each latch being provided with an upwardly facing shoulder, and the aforesaid framework having a downwardly facing surface arranged to be overlapped by said shoulder in the aforesaid position of the head.

19. In a mold-making machine, a pivoted pattern-plate-carrier arranged to swing in a vertical plane; a table which is arranged at one side of the axis of said carrier and normally in its lower position; a double-faced pattern-plate borne by said carrier and adapted to be swung by the carrier into a substantially horizontal position in opposite directions and arranged in one position over and spaced from the aforesaid table; another oscillatorily supported carrier, and a head borne by the last-mentioned carrier and arranged in one position of said last-mentioned carrier substantially horizontally over and spaced from the pattern-plate in the aforesaid position of the pattern-plate, the pattern-plate-carrier being shiftable upwardly independently of the head-carrier and being normally in its lower position.

20. In a mold-making machine, a suitably supported movable pattern-plate adapted to be actuated into a substantially horizontal position for receiving a flask-section of a mold, a suitably supported movable head arranged to be actuated into a substantially horizontal position over the body of molding sand supplied to said flask-section upon mounting the latter on the pattern-plate in said position of the pattern-plate, which head has the contour and dimensions required to render it capable of being embraced by the upper end of said flask-section, the pattern-plate being shiftable upwardly independently of said head in said position of the pattern-plate to elevate the flask-section independently of said head, and means for supporting said flask-section in its elevated position independently of the pattern-plate.

21. In a mold-making machine, the combination, with a suitably supported movable pattern-plate adapted to be actuated into a substantially horizontal position for receiving a flask-section of a mold, and a suitably supported head capable of movement into a substantially horizontal position over the body of molding sand supplied to said flask-section upon mounting the latter on the pattern-plate in the aforesaid position of the pattern-plate, which head has the contour and dimensions required to render it capable of being embraced by the upper end of said flask-section, the pattern-plate being shiftable upwardly independently of said head in said position of the pattern-plate to effect an upward movement of the flask-section independently of said head, of suitably supported movable seat-forming members for supporting said flask-section in an elevated position independently of the pattern-plate, and means for effecting the actuation of said seat-forming members from their inoperative into their operative position during the aforesaid movements of the head and flask-section.

22. In a mold-making machine, the combination with a movable pattern-plate adapted to be actuated into a substantially horizontal position for receiving a flask-section of a mold, and a head capable of movement into a substantially horizontal position over the body of molding sand supplied to said flask-section upon mounting the latter on the pattern-plate in said position of the pattern-plate, which head has the contour and dimensions required to render it capable of being embraced by the upper end of said flask-section, the pattern-plate being shiftable upwardly independently of said head in said position of the pattern-plate to effect an upward movement of said flask-section independently of said head, of two pairs of suitably supported movable seat-forming members for supporting said flask-section in an elevated position independently of the pattern-plate, which pairs of seat-forming members are spaced far enough apart to permit the location of said flask-section between them, said pairs of seat-forming members being in an operative position or inoperative position according as they have been actuated the extent required toward or from each other.

23. In a mold-making machine, the combination, with a movable pattern-plate adapted to be actuated into a substantially horizontal position for receiving a flask-section of a mold, and a head capable of movement into a substantially horizontal position over the body of molding sand supplied to said flask-section upon mounting the latter on the pattern-plate in said position of the pattern-plate, which head is adapted to be embraced by the upper end of said flask-section, the pattern-plate being shiftable upwardly independently of said head in said position of the pattern-plate to elevate the flask-section independently of said head, of pivoted seat-forming members for supporting said flask-section in an elevated position independently of the pattern-plate, each seat-forming member being in an operative position or inoperative position according as it has been swung the extent required in the one or the other direction.

24. In a mold-making machine, the combination, with a movable pattern-plate adapted to be actuated into a substantially horizontal position for receiving a flask-section of a mold, an oscillatorily supported holder or carrier arranged to swing in a vertical plane, and a head borne by said carrier and arranged to be swung, during the movement of said carrier in one direction, into a substantially horizontal position over the body of molding sand supplied to said flask-section upon mounting the latter on the pattern-plate in the aforesaid position of the pattern-plate, which head is adapted to be embraced by the upper end of said flask-section, the pattern-plate being shiftable upwardly independently of said head in said position of the pattern-plate to effect an upward movement of said flask-section independently of said head, of movable seat-forming members for supporting said flask-section in an elevated position independently of the pattern-plate, and resilient means arranged to actuate said seat-forming members from their inoperative into their operative position during the aforesaid movements of the head-carrier and flask-section.

25. In a mold-making machine, the combination, with a movable pattern-plate adapted to be actuated into a substantially horizontal position for receiving a flask-section of a mold, an oscillatorily supported holder or carrier arranged to swing in a vertical plane, and a head borne by said carrier and arranged to be swung, during the movement of said carrier in one direction, into a substantially horizontal position over the body of molding sand supplied to said flask-section upon mounting the latter on the pattern-plate in the aforesaid position of the pattern-plate, which head is adapted to be embraced by the upper end of said flask-section, the pattern-plate being shiftable upwardly independently of said head in said position of the pattern-plate to effect an upward movement of said flask-section independently of said head, of resilient members borne by the aforesaid carrier, and movable seat-forming members for supporting said flask-section in an elevated position independently of the pattern-plate, said seat-forming members in their inoperative position being arranged to be actuated by said resilient members into their operative position during the aforesaid movements of the head-carrier and flask-section.

26. In a mold-making machine, the combination, with a movable pattern-plate adapted to be actuated into a substantially horizontal position for receiving a flask-section of a mold, an oscillatorily supported holder or carrier, and a head borne by said carrier and arranged to be swung, during the movement of said carrier in one direction, into a substantially horizontal position over the body of molding sand supplied to said flask-section upon mounting the latter on the pattern-plate in the aforesaid position of the pattern-plate, which head is adapted to be embraced by the upper end of said flask-section, the pattern-plate being shiftable upwardly independently of said head in the aforesaid position of the pattern-plate to effect an upward movement of said flask-section independently of said head, of resilient members borne by the aforesaid carrier and extending circumferentially of the axis of said carrier from said carrier in the direction in which said carrier moves in actuating the head into its aforesaid position, each resilient member being nearest the axis of said carrier at its point of attachment to said carrier and gradually spaced farther from said axis in the direction of its free end, and movable seat-forming members for supporting the aforesaid flask-section in an elevated position independently of the pattern-plate, said seat-forming members in their inoperative position being arranged to be actuated by said resilient members into their operative position during the aforesaid movements of the head-carrier and flask-section.

27. In a mold-making machine, the combination, with a movable pattern-plate adapted to be actuated into a substantially horizontal position for receiving the upper flask-section of a mold; an oscillatorily supported holder or carrier; a head borne by said carrier and arranged to be swung, during the movement of said carrier in one direction, into a substantially horizontal position over the body of molding sand supplied to said flask-section upon mounting the latter on the pattern-plate in the aforesaid position of the pattern-plate, which head is adapted to be embraced by the upper end of said flask-section, the pattern-plate being shiftable upwardly independently of said head in said position of the pattern-plate to effect an upward movement of said flask-section independently of said head, and resilient members borne by the aforesaid carrier, of movable seat-forming members for supporting said flask-section in an elevated position independently of the pattern-plate, said seat-forming members in their inoperative position being arranged to be actuated by said resilient members into an operative position during the aforesaid movements of the head-carrier and flask-section, and other movable seat-forming members for supporting the flask-section in an elevated position, said second-mentioned seat-forming members being spaced farther from the axis of said carrier than and operatively connected with the first-mentioned seat-forming members and arranged to be actuated from an inoperative into an operative position during the movement of the first-mentioned seat-forming members into an operative position.

28. In a mold-making machine, the combination, with a pivoted pattern-plate-carrier arranged to swing in a vertical plane, and an upwardly movable table arranged at one side of the axis of said carrier and adapted to receive a mold-bottom movable within and endwise of the lower flask-section of a mold; a double-faced pattern-plate borne by said carrier and arranged in one position substantially horizontally at the opposite side of said axis for the reception of said flask-section lower-end-up to permit supplying of molding sand and the of said mold-bottom to said flask-section and adapted to be swung with said flask-section and mold-bottom into a substantially horizontal position over the table, and a head capable of movement into position over the body of molding sand supplied to the upper flask-section of the mold upon mounting said upper flask-section on the pattern-plate in the last-mentioned position of the pattern-plate, said head being adapted to embrace the upper end of the upper flask-section, the pattern-plate-carrier being normally in its lower position, the pattern-plate being adapted to rest at its free end on the lower flask-section in the lower position of the pattern-plate, and the pattern-plate-carrier and connected pattern-plate being shiftable upwardly independently of the aforesaid head in the lower position of the pattern-plate to elevate the upper flask-section independently of said head, of means for supporting the upper flask-section in an elevated position independently of the pattern-plate, and means for supporting the pattern-plate at its free end in the lower position of the pattern-plate-carrier independently of the table and lower flask-section.

29. In a mold-making machine, an upwardly shiftable pivoted pattern-plate-carrier arranged to swing in a vertical plane and normally in its lower position; an upwardly movable table which is arranged at one side of the axis of said carrier and normally in its lower position; a double-faced pattern-plate borne by said carrier and adapted to be swung by the carrier into a substantially horizontal position in opposite directions and arranged in one position over and spaced from the aforesaid table; another oscillatorily supported carrier; a head borne by the last-mentioned carrier and arranged in one position of said last-mentioned carrier substantially horizontally over and spaced from the pattern-plate in the aforesaid position of the pattern-plate, and a bracket for supporting the pattern-plate at its free end in an elevated position of the pattern-plate-carrier during the descent of the table.

30. In a mold-making machine, the combination, with a pivoted pattern-plate-carrier arranged to swing in a vertical plane; an upwardly movable table which is arranged at one side of the axis of said carrier and normally in its lower position; a double-faced pattern-plate borne by said carrier and adapted to be swung by the carrier into a substantially horizontal position in opposite directions and arranged in one position over and spaced from the aforesaid table; another oscillatorily supported carrier, and a head borne by the last-mentioned carrier and arranged in one position of said last-mentioned carrier substantially horizontally over and spaced from the pattern-plate in the aforesaid position of the pattern-plate, the pattern-plate-carrier being shiftable into an elevated position independently of the head-carrier and being normally in its normal position, of a bracket for supporting the pattern-plate at its free end during the descent of the table in said elevated position of the pattern-plate-carrier, said bracket being adjustable up and down.

31. In a mold-making machine, the combination, with two laterally spaced posts which are free to move upwardly; a holder or carrier for a pattern-plate, which carrier is pivotally connected to said posts and arranged to swing in a vertical plane; post-guiding members, and seats for the posts, of means for clamping the posts to the post-guiding members.

32. In a mold-making machine, the combination, with two laterally spaced posts which are free to move upwardly; a holder or carrier for a pattern-plate, which carrier is pivotally connected to said posts and arranged to swing in a vertical plane; post-guiding members, and seats for the posts, of a suitably supported rock-shaft arranged centrally between the aforesaid post-guiding members, and suitably supported movable clamping members operatively connected with the shaft and normally in an inoperative position, the relative arrangement of the parts being such that the clamping members are caused to clamp the posts to the post-guiding members upon oscillating the shaft in the direction and to the extent required.

33. In a mold-making machine, the combination, with two laterally spaced posts which are free to move upwardly; a holder or carrier for a pattern-plate, which carrier is pivotally connected to said posts and arranged to swing in a vertical plane; post-guiding members, and seats for the posts, of a rock-shaft which is arranged substantially horizontally and at a right angle to the axis of the aforesaid carrier centrally between the aforesaid post-guiding members, and clamping members pivoted to the post-guiding members and operatively connected with the shaft, said clamping members being normally in an inoperative position and having their axes parallel with the shaft, the relative arrangement of the parts being such that the clamping members are caused to clamp the posts to the post-guiding members upon oscillating the shaft in the direction and to the extent required.

34. In a mold-making machine, the combination, with a pivoted pattern-plate-carrier arranged to swing in a vertical plane; a double-faced pattern-plate borne by said carrier and being in a substantially horizontal position at one side of the axis of said carrier for the reception of the lower flask-section of a mold, or in a substantially horizontal position at the opposite side of said axis, according as the pattern-plate has been swung the extent required in the one or the other direction, and a head capable of movement into a substantially horizontal position over the body of molding sand supplied to the upper flask-section of a mold upon mounting said upper flask-section on the pattern-plate in the last-mentioned position of the pattern-plate, said head being adapted to embrace the upper end of the upper flask-section, the pattern-plate-carrier and connected pattern-plate being shiftable upwardly independently of said head in the last-mentioned position of the pattern-plate to elevate the upper flask-section independently of said head, of movable seat-forming members for supporting the upper flask-section in an elevated position independently of the pattern-plate; means for effecting the actuation of said seat-forming members from their inoperative into their operative position during the aforesaid movements of the head and flask-section, and means for effecting the actuation of said seat-forming members from an operative into an inoperative position during the movement of the pattern-plate into its first-mentioned position.

35. In a mold-making machine, the combination, with a pivoted pattern-plate-carrier arranged to swing in a vertical plane; a double-faced pattern-plate borne by said carrier and being in a substantially horizontal position at one side of the axis of said carrier for the reception of the lower flask-section of a mold, or in a substantially horizontal position at the opposite side of said axis, according as the pattern-plate has been swung the extent required in the one or the other direction, and a head capable of movement into a substantially horizontal position over the body of molding sand supplied to the upper flask-section of a mold upon mounting said upper flask-section on the pattern-plate in the last-mentioned position of the pattern-plate, said head being adapted to embrace the upper end of the upper flask-section, the pattern-plate-carrier and connected pattern-plate being shiftable upwardly independently of said head in the last-mentioned position of the pattern-plate to elevate the upper flask-section independently of said head, of movable seat-forming members for supporting the upper flask-section in an elevated position independently of the pattern-plate, and means for effecting the actuation of said seat-forming members from their inoperative into their operative position during the aforesaid movements of the head and flask-section, the pattern-plate having shoulders arranged to effect the actuation of said seat-forming members from an operative into an inoperative position during the movement of the pattern-plate into its first-mentioned position.

36. In a mold-making machine, the combination, with a movable pattern-plate which in one position is arranged to receive the upper flask-section of a mold; an oscillatorily supported holder or carrier; and a head borne by said carrier and arranged to be swung, during the movement of said carrier in one direction, into a substantially horizontal position over the body of molding sand supplied to said flask-section upon mounting the latter on the pattern-plate in the aforesaid position of the pattern-plate, which head is adapted to be embraced by the upper end of said flask-section, the pattern-plate being shiftable upwardly independently of said head in said position of the pattern-plate to effect an upward movement of said flask-section independently of said head, of movable seat-forming members for supporting said flask-section in an elevated position independently of the pattern-plate; means for actuating said seat-forming members from an inoperative into an operative position during the aforesaid movements of the head-carrier and flask-section, and other movable seat-forming members for supporting the flask-section in an elevated position, which second-mentioned seat-forming members are spaced farther from the axis of the aforesaid carrier than and operatively connected with the first-mentioned seat-forming members and arranged to be actuated from an inoperative into an operative position during the movement of the first-mentioned seat-forming members into an operative position, said second-mentioned seat-forming members being provided with means for supporting the pattern-plate.

In testimony whereof, I sign the foregoing specification, in the presence of two witnesses.

WILLIAM C. LANG.

Witnesses:
  B. C. BROWN,
  N. L. McDANIEL.